US007301682B1

(12) United States Patent
Puttkammer

(10) Patent No.: US 7,301,682 B1
(45) Date of Patent: Nov. 27, 2007

(54) OPTICALLY VARIABLE SECURITY ATTRIBUTE

(75) Inventor: Frank Puttkammer, Coswig (DE)

(73) Assignee: WHD Elektronische Prueftechnik GmbH, Dresden (DE)

( * ) Notice: Subject to any disclaimer, the term of this patent is extended or adjusted under 35 U.S.C. 154(b) by 1564 days.

(21) Appl. No.: 10/110,600

(22) PCT Filed: Jun. 14, 2000

(86) PCT No.: PCT/DE00/01908

§ 371 (c)(1), (2), (4) Date: Apr. 10, 2002

(87) PCT Pub. No.: WO00/76778

PCT Pub. Date: Dec. 21, 2000

(30) Foreign Application Priority Data

Jun. 15, 1999 (DE) ................................ 199 28 060

(51) Int. Cl.
*G03H 1/00* (2006.01)
*B42D 15/00* (2006.01)

(52) U.S. Cl. ............................................ 359/2; 283/83

(58) Field of Classification Search .................... 359/2, 359/566, 571, 576; 283/83
See application file for complete search history.

(56) References Cited

U.S. PATENT DOCUMENTS

| | | | | |
|---|---|---|---|---|
| 6,157,487 A * | 12/2000 | Staub et al. | | 359/567 |
| 6,248,818 B1 | 6/2001 | Kim et al. | | |
| 6,294,241 B1 | 9/2001 | Kaule | | |
| 6,368,709 B1 | 4/2002 | Schleussner | | |

FOREIGN PATENT DOCUMENTS

| | | |
|---|---|---|
| CA | 2046711 | 7/1981 |
| DE | 3932505 A1 | 9/1989 |
| DE | 38 43 075 | 7/1990 |
| DE | 40 30 493 | 4/1992 |
| DE | 44 19 173 | 12/1995 |
| DE | 195 15 988 | 11/1996 |
| DE | 298 07 638 | 9/1998 |
| EP | 0753623 A2 | 7/1996 |
| EP | 0753623 | 1/1997 |
| EP | 0999242 B1 | 3/2003 |
| WO | WO94/19201 | 9/1994 |

OTHER PUBLICATIONS

International Search Report 99/01806, Nov. 26, 1999.
International Search Report 94/00417, Jun. 1, 1994.
Ink Jet Label Printing on Yarn, Dec. 1995.
International Search Report 00/01908, Nov. 17, 2000.
Preliminary Opinion, Dec. 13, 2005.
Decision to Maintain EP Patent, Feb. 6, 2005.
2244 Research Disclosure Dec. 1995, No. 380, Emsworth, GB: Polythiophene zur Herstellung von auslesbaren Markierungen.

* cited by examiner

*Primary Examiner*—Alessandro Amari
(74) *Attorney, Agent, or Firm*—Neifeld IP Law, PC

(57) ABSTRACT

The invention relates to an optically variable security attribute for documents, securities, bank notes, packaging and goods.

The task of the invention is to provide an optically variable security attribute with covert detectable characteristics to improve safety against counterfeiting. In accordance with the invention, the task is accomplished in an optically variable security attribute with diffractive structures consisting of an electrically conductive polymer and at least one support web (1), a protection layer (7), a lacquer layer (3) and a reflection layer (4) by the electrically conductive polymer being polyethylenedioxythiophene polystyrene-sulfunate (PEDT/PSS).

13 Claims, 1 Drawing Sheet

OPTICALLY VARIABLE SECURITY ATTRIBUTE

BACKGROUND OF THE INVENTION

1. Field of the Invention

The invention relates to an optically variable security attribute for documents, securities, bank notes, packaging and goods.

2. The Prior Art

The introduction of optically variable security attributes has significantly improved the safety from counterfeiting of documents, securities, bank notes, packaging and products. One kind of optically variable security attributes are holograms the data of which can be seen by human vision are subject to change when observed from different angles. The effect yielded an excellent protection against copying since angle-dependant changes could not be copied by a copying apparatus.

Such holograms conventionally consist of a support web, a layer of hardenable lacquer with diffractive structures embossed into it, as well as of a reflection and an additional protection layer. In holograms, the reflection layer consists of a highly brilliant metallization vapor deposited in a high vacuum, which for purposes of checking its authenticity may additionally contain a functional design of demetallized sites which may or may not be seen by human vision. The demetallized sites may be shaped as symbols, letters or geometric figures.

The technological equipment required for fabricating holograms as well analytical apparatus for the recognition of micro-lettering and micro-designs are nowadays readily available to counterfeiters, thus enticing increased safety against counterfeiting by further, and possibly covert, detectable attributes.

From German patent specification DE 298 07 638 it is known to provide the embossing web of a hologram in which one or more security attributes are present, with an additional individualizing characteristic which may be seen by human vision. The characteristic consists, among others, of the removal of a reflection layer, the interruptions thus created serving as the characterizing element.

German patent specification DE 40 30 493 further discloses the application, on a multi-layered data support, of an optically variable element in which there are present retro-fitted additional data recognizable by human vision, e.g. a pattern for a functional design, which are superposed on the optical effect.

German patent specification DE 39 32 505 describes diffractive structures the standard data of which may be altered, in a way detectable by human vision, by additional measures, such as, for instance, removal of the metal layer.

From German patent specifications DE 44 19 505 and DE 44 19 173 magnetizable glossy pigments and mixtures of glossy pigments have become known which are suitable for generating three-dimensional optical effects by the application of magnetic fields during or after application while the application medium is still in a liquid state. They are based upon multiply-coated platelet-shaped non-ferromagnetic metallic substrates, and they are used in lacquers and printing dyes. They are said to be capable of replacing expensive holograms; however, their yieldable color titration is still too low. German patent specification DE 195 15 988 also describes that glossy pigments are used for dying lacquers, inks and printing dyes.

Moreover, German patent specification discloses that in holograms the metallic web usually used a reflection layer may also be fabricated by vapor deposition in vacuum or by applying thin layers of aluminum. Another possibility resides in a described casting method. The thin metal layers collapse and the hologram is destroyed when attempts are made to remove it a security.

From Research Disclosure, December 1995/787, it is known that markings ranging from light to invisible to the eye may be made from suitable polythiophenes, e.g. 3,4-polyethylenedioxythiophene. They absorb light close to the infrared range whereas in visible light they are substantially transparent. A further possibility of distinguishing polythiophene markings is based on their electrical conductivity. Differences in their surface resistance between the non-conductive support and the conductive markings may be registered by suitable arrangements of electrodes.

Furthermore, it is known from European patent specification EP 753 623 to make a security sheet incorporating an electrically conductive element as protection against counterfeiting. The conductive element consists of a polythiophene polymer. Printing dyes containing metallic pigments are similarly mentioned.

Finally, German patent specification DE 38 43 075 describes an arrangement in a security document with a security thread containing a metallic coating. Immediately adjacent the coating there is provided a layer containing electrically conductive pigments or a layer of plastic rendered electrically conductive by its molecular structure. The layer serves to bridge possible interruptions in the metallic coating of the security thread.

The reason for using the holograms as security attributes for individual articles, such as securities or goods, is predicated on their fabrication in large numbers in mostly large-scale industrial plants at as low a price as possible. This is, however, limited by currently practiced technological fabrication processes.

OBJECT OF THE INVENTION

It is an object of the invention, for improving its safety against counterfeiting, to provide an optically variable security attribute with covert detectable characteristics the fabrication of which is to be quick and cost-efficient in spite of their application.

SUMMARY OF THE INVENTION

In accordance with the invention the object is accomplished by the elements and features as well as by their particular embodiments set forth in the ensuing description.

The solution in accordance with the invention offers the advantage of providing security attributes with covert detectable characteristics which cannot be detected by human vision and which may be represented by an image or which, by bridging interruptions, functionally complement each other as a total unit. At the same time, the surprising advantage results of a continuously running, time-saving and cost-efficient method of making optically variable security attributes.

DESCRIPTION OF THE DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF PREFERRED EMBODIMENTS

Figure 1:
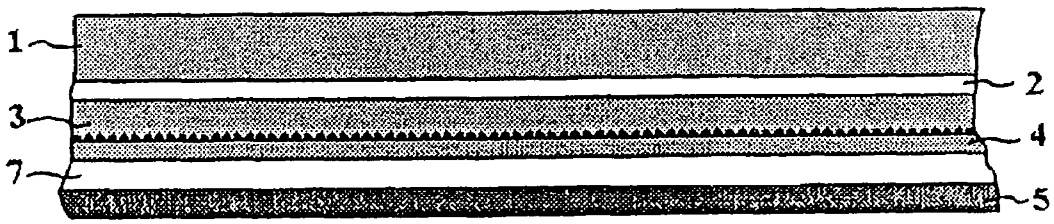
FIGS. 1-3 depict the different schematic structure of an optically variable security attribute, in part with a functional design 6 in the reflection layer 4.
Figure 2:
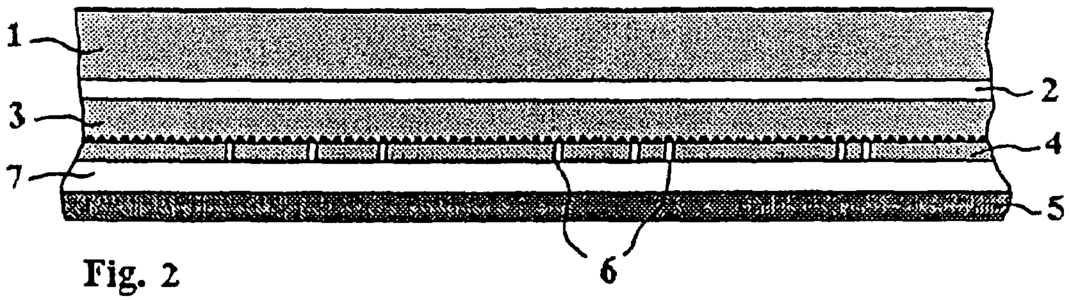
Figure 3:
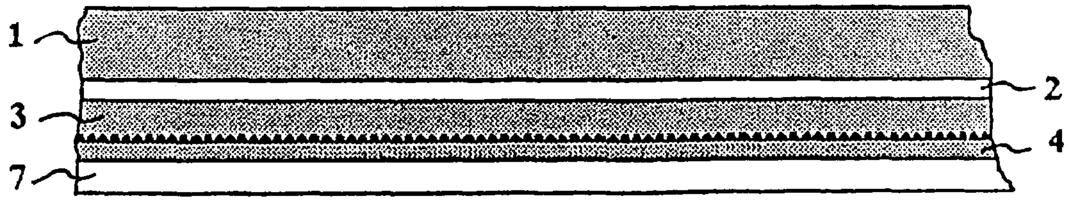

In FIGS. 1-3 schematically depict the different structure of an optically variable security attribute, e.g. a hologram, consisting of a support web 1, a layer of PEDT/PSS (polyethylenedioxythiophene polystyrene sulfonate) 2, a layer 3 of hardenable lacquer, preferably as a support of diffractive structures, a reflection layer 4, a protection layer 7 and an adhesive layer 5.

FIG. 2 shows that the reflection layer 4 contains a functional design 6 formed by interruptions.

FIG. 3 makes apparent the absence of the adhesive layer 5. This type of structure of an optically variable security attribute is provided for cases in which the surface upon which the security attribute is to be applied is already provided with an adhesive layer.

The optically variable security attribute in accordance with the invention functions as follows: Knowing that the reflection layer 4 may well contain a functional design 6 of micro-lettering or other interruptions beyond recognition by human vision, counterfeiters will be able within a very short time to insert such a functional design 6 into an optically variable security attribute. To increase the safety against counterfeiting, an electrically conductive substance is applied to the support web 1 by a layer of PEDT/PSS 2 as a transparent electrically conductive polymer. The PEDT/PSS 2 layer cannot be recognized by human vision and can only be detected by proof of its electrical conductivity.

The layer 2 of PEDT/PSS may form a functional design and to this end it is applied to the support web 1 as an uninterrupted surface or as a surfaces divided by a line-type interruption. In the first case, it is the electrical conductivity which will be recognized, in the second case, it is the electrical interruption of the otherwise electrically conductive surface which is to be examined. The layer 2 of PEDT/PSS may, however, also be applied to the support web 1 as a line or as a plurality of adjacent straight or curved lines. In such a case, the pattern of the lines is to be recognized and, optionally, evaluated by testing means. Similar to the lines the layer 2 of PEDT/PSS may also be structured as dots. The conductivity of the layer 2 of PEDT/PSS may be adjusted either by the manner it is applied or by the kind of its specific formulation.

The reflection layer 4 contains the functional design 6 structured as interruptions. Preferably, these interruptions of the reflection layer 4 which are beyond recognition by human vision, follow the structure of the image of the diffractive structure of the hologram. In this manner, their detection is rendered more difficult.

The functional design in the PEDT/PSS 2 and the functional design 6 of the reflection layer 4 are preferably arranged in neighboring planes. In such a case, parts of the functional design in the PEDT/PSS 2 and the functional design 6 of the reflection layer 4 cooperate so as to bridge interruptions in the reflection layer 4. In this way, in spite of the interruptions in the reflection layer 4, a coding results which may be evaluated by a machine. Where the PEDT/PSS 2 and the reflection layer 4 are arranged in planes separated from each other, their design is preferably structured such that only together will they yield an image recognizable by corresponding testing means.

By comparison with other organic conductors, such as the hitherto known polythiophenes as well as polypyrrole or polyaniline, the PEDT/PSS 2 has substantially better properties. In visual light, it displays higher transmission. It yields transparent coatings ranging from colorless to slightly blue. Depending upon fabrication conditions it is possible to achieve minimum surface resistances. It possesses better resistance against hydrolysis, good light and temperature consistencies and high absorption in the range of from 900-2,000 nm as well as no maximum absorption in the range of visible light up to 800 nm.

In accordance with the invention the PEDT/PSS 2 is applied as an aqueous dispersion. This type of application blends into the fabrication technology of such security attributes such that no interruptions occur in a continuous production process.

In a variant advantageous for certain cases of application, the PEDT/PSS 2 is applied to layers of the optically variable security attribute provided for this purpose, in its monomeric precursor stage as a 3,4-ethylenedioxythiophene (EDT) and is thereafter polymerized to PEDT/PSS 2 by an oxidation agent, i.e. a solution of iron-III-toluenesulfonate (ferric tosylate) in n-butanol.

What is claimed is:

1. An optically variable security attribute for a document, comprising:

at least one support web;

a lacquer layer;

a reflection layer;

a protection layer; and diffractive structures comprising polyethylenedioxythiophene polystyrenesulfonate (PEDT/PSS).

2. The optically variable security attribute of claim 1, wherein the diffractive structures are arranged between the support web and the lacquer layer.

3. The optically variable security attribute of claim 1, further comprising an adhesive layer.

4. The optically variable security attribute of claim 3, wherein the adhesive layer is disposed over the protection layer.

5. The optically variable security attribute of claim 1, wherein the PEDT/PSS forms a functional design.

6. The optically variable security attribute of claim 5, wherein the protection layer forms a functional design.

7. The optically variable security attribute of claim 6, wherein the functional design of the PEDT/PSS and of the protection layer complement each other to form an image.

8. The optically variable security attribute of claim 6, wherein the functional design of the PEDT/PSS and of the protection layer form interrupted electrically conductive surface patterns complementing each other to bridge the interruptions to form a unit capable of being electrically tested.

9. The optically variable security attribute of claim 1, wherein the PEDT/PSS is applied to the support web to form an uninterrupted surface thereon.

10. The optically variable security attribute of claim 1, wherein the PEDT/PSS is applied to the support web to form thereon as a surface divided by at least one line-type interruption.

11. The optically variable security attribute of claim 1, wherein the PEDT/PSS is applied to the support web to form thereon as at least one line.

12. The optically variable security attribute of claim 1, wherein the PEDT/PSS is applied to the support web to form thereon a plurality of dots.

13. The optically variable security attribute of claim 1, wherein the PEDT/PSS is applied to the support web according to formulation CPP 105.

* * * * *